(12) United States Patent
Deng et al.

(10) Patent No.: US 12,068,717 B2
(45) Date of Patent: Aug. 20, 2024

(54) PHOTOVOLTAIC ARRAY FAULT DIAGNOSIS METHOD BASED ON COMPOSITE INFORMATION

(71) Applicant: BEIJING INSTITUTE OF TECHNOLOGY, Beijing (CN)

(72) Inventors: Fang Deng, Beijing (CN); Zelang Liang, Beijing (CN); Ning Ding, Beijing (CN); Xinyu Fan, Beijing (CN); Xin Gao, Beijing (CN); Yeyun Cai, Beijing (CN); Jie Chen, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 871 days.

(21) Appl. No.: 17/093,244

(22) Filed: Nov. 9, 2020

(65) Prior Publication Data
US 2021/0135625 A1 May 6, 2021

Related U.S. Application Data

(63) Continuation of application No. PCT/CN2019/000095, filed on May 7, 2019.

(30) Foreign Application Priority Data

May 9, 2018 (CN) .......................... 201810439521.5

(51) Int. Cl.
*H02S 50/10* (2014.01)
*G06F 18/21* (2023.01)
(Continued)

(52) U.S. Cl.
CPC .......... *H02S 50/10* (2014.12); *G06F 18/2135* (2023.01); *G06F 18/214* (2023.01);
(Continued)

(58) Field of Classification Search
CPC ...... H02S 50/10; G06V 10/809; G06V 10/82; G06V 10/774; G06V 10/776;
(Continued)

(56) References Cited

U.S. PATENT DOCUMENTS

| | | | |
|---|---|---|---|
| 2014/0278108 A1* | 9/2014 | Kerrigan | G01W 1/10 702/3 |
| 2018/0238951 A1* | 8/2018 | Tao | G06F 18/29 |

(Continued)

*Primary Examiner* — Beau D Spratt
(74) *Attorney, Agent, or Firm* — Yong Chen

(57) ABSTRACT

A photovoltaic array fault diagnosis method based on composite information is provided. The method includes: collecting and preprocessing composite information data of photovoltaic array working state, including image data and text data; using the image data of photovoltaic array working state to train a pre-established fault classification model of deep convolutional neural network, to thereby obtain an image fault classification model; using the text data of photovoltaic array working state to train a pre-established fault classification model based on a support vector machine, to thereby obtain a text fault classification model; fusing the image fault classification model and the text fault classification model by logistic regression algorithm to obtain a fusion model, and training the fusion model using the composite information data of photovoltaic array working state to thereby obtain the photovoltaic array fault diagnosis model.

5 Claims, 1 Drawing Sheet

(51) Int. Cl.
  *G06F 18/2135* (2023.01)
  *G06F 18/214* (2023.01)
  *G06F 18/241* (2023.01)
  *G06F 18/25* (2023.01)
  *G06N 3/04* (2023.01)
  *G06N 3/084* (2023.01)
  *G06T 7/00* (2017.01)
  *G06V 10/764* (2022.01)
  *G06V 10/774* (2022.01)
  *G06V 10/776* (2022.01)
  *G06V 10/80* (2022.01)
  *G06V 10/82* (2022.01)

(52) U.S. Cl.
  CPC .......... *G06F 18/217* (2023.01); *G06F 18/241* (2023.01); *G06F 18/25* (2023.01); *G06N 3/04* (2013.01); *G06N 3/084* (2013.01); *G06T 7/0002* (2013.01); *G06V 10/764* (2022.01); *G06V 10/774* (2022.01); *G06V 10/776* (2022.01); *G06V 10/809* (2022.01); *G06V 10/82* (2022.01); *G06T 2207/10024* (2013.01); *G06T 2207/10048* (2013.01); *G06T 2207/20081* (2013.01); *G06T 2207/20084* (2013.01)

(58) Field of Classification Search
  CPC ..... G06V 10/764; G06F 18/217; G06F 18/25; G06F 18/2135; G06F 18/214; G06F 18/241; G06N 3/04; G06N 3/084; G06T 7/0002; G06T 2207/10024; G06T 2207/10048; G06T 2207/20081; G06T 2207/20084
  See application file for complete search history.

(56) References Cited

U.S. PATENT DOCUMENTS

| | | | |
|---|---|---|---|
| 2019/0311203 A1* | 10/2019 | Shah | G06N 3/045 |
| 2020/0133220 A1* | 4/2020 | Anichkov | G06Q 50/06 |
| 2022/0138487 A1* | 5/2022 | Chang | G06N 20/00 |
| | | | 706/12 |

* cited by examiner

PHOTOVOLTAIC ARRAY FAULT DIAGNOSIS METHOD BASED ON COMPOSITE INFORMATION

FIELD

The invention relates to the technical field of fault diagnosis, in particular to a method for fault diagnosis of a photovoltaic array based on composite information.

BACKGROUND

With the sharp increase of the demand for fossil fuels such as coal, oil and natural gas, non-renewable resources will be exhausted one day. Moreover, the burning of fossil fuels will produce a lot of harmful gases, which will greatly harm the living environment of human beings. Therefore, as a renewable resource, solar energy has become the most ideal renewable energy because it is inexhaustible, clean and environmentally friendly, and not limited by geographical factors.

The development of solar photovoltaic technology has brought huge economic benefit, but in practice, due to the manufacturing or the cause of environmental, photovoltaic array can appear all kinds of fault, the fault mainly has three kinds: solar panels lobes problem, aging caused by long-term use and hot spots in photovoltaic arrays.

At present, the diagnosis methods for these faults include time-domain reflection method, intelligent algorithm, power comparison method, electrical characteristic detection method and infrared image detection method. The time-domain reflection method is similar to the radar detection method. The input signal enters the input line, when there is impedance mismatch, the reflected signal will be generated. The fault will be detected by comparing the input signal with the reflected signal. The intelligent algorithm needs to train the algorithm by collecting a large number of fault data. Although the effect is better, data acquisition becomes the biggest obstacle. Although the power comparison method is simple, it cannot locate the fault and can only judge whether the fault occurs. The electrical characteristic detection method uses voltage and current sensors to analyze the signal, so as to realize fault diagnosis. It needs a large number of sensors to realize signal collection, so it has great limitations. The infrared image diagnosis method is based on the fact that there will be a certain temperature difference between normal and abnormal conditions after the failure of solar panels, and the infrared image can exactly reflect the temperature difference characteristics of solar panels. At the same time, infrared images can not only realize the fixed point detection of faults, but also be easy to collect. However, infrared images can only judge whether the solar panels have faults, and there is no way to identify the fault types. To sum up, no matter it is based on infrared image or text data such as current and voltage, the utilization of fault information has certain limitations, insufficient comprehensiveness and low accuracy.

SUMMARY

In view of this, the present invention provides a photovoltaic array fault diagnosis method based on composite information. In this method, fault classification models are established for image data and text data respectively, and the two are fused to obtain the photovoltaic array fault diagnosis model based on composite information, which realizes the comprehensive utilization of fault information and greatly improves the fault diagnosis accuracy.

To achieve the above purposes, the technical solution of the invention is as follows:

The photovoltaic array fault diagnosis method based on composite information, comprising:

S1. Collecting and preprocessing composite information data of photovoltaic array working state, the composite information including image data of photovoltaic array working state and text data of photovoltaic array working state;

S2. Using the image date of the photovoltaic array working state to train a pre-established fault classification model of deep convolutional neural network for training, whereby an image fault classification model is obtained after the training;

Using the text data of photovoltaic array working state to train a pre-established fault classification model based on a support vector machine (SVM), whereby a text fault classification model is obtained after the training;

S3. Fusing the image fault classification model and the text fault classification model by a logistic regression algorithm to obtain a fusion model, where the composite information data of photovoltaic array working state are used to train the fusion model, and the photovoltaic array fault diagnosis model based on the composite information is obtained after the training.

And further, the working state of the photovoltaic array includes: normal working state, hot spot fault, open circuit fault and short circuit fault. where corresponding labels are set for each working state.

The image data of photovoltaic array working state include the photovoltaic array infrared images and the working state labels of the photovoltaic array.

The text data of photovoltaic array working state include the open-circuit voltage, short-circuit current, maximum high-power point voltage, maximum high-power point current, ambient light intensity, temperature and labels describing the working state of the photovoltaic array.

The method can further include preprocessing the composite information data of photovoltaic array working state which preprocessing can include preprocessing the image data and text data of photovoltaic array working state.

The preprocessing of the image data of photovoltaic array working state can include: converting the image data of array working state into RGB images and the data is standardized; using principal component analysis (PCA) whitening to process the image data of array working state after standardized processing.

The preprocessing of the text data of photovoltaic array working state can include: standardizing the text data of photovoltaic array working state.

And further, the fault classification model of deep convolutional neural network is established in advance by using the image data of photovoltaic array working state for training, the image fault classification model is obtained after the training. This can include:

The fault classification model of deep convolutional neural network is established in advance, including an input layer, a convolution layer, a pooling layer, a fully connected layer and an output layer.

The image data of photovoltaic array working state is used as the training sample images. Multiple training sample images are randomly sampled to form a minimum batch file, namely mini-batch. It is input to the input layer of fault classification model of deep convolutional neural network.

The input layer inputs the training sample images of the minimum batch file (mini-batch) into the convolution layer.

There are n convolution kernels in the convolution layer. n is a set value. The n convolution kernels are used to perform convolution filtering on the images in the convolution layer to extract n neighborhood feature images.

The neighborhood feature images are then input into the pooling layer. The pooling layer uses the maximum pooling technology to sample the neighborhood feature images and obtain the new feature images.

The fault classification model of deep convolutional neural network has a set number of convolution layers and pooling layers. The new feature images obtained from the pooling layer would always be input into the next convolution layer or the fully connected layer.

By the fully connected layer, the new feature images are expanded into one-dimensional feature vectors, which would be outputted in the output layer as the training sample image features.

Output layer is a softmax classifier which uses the training sample image features and the photovoltaic array working state labels of the training sample images to train the softmax classifier, and uses the back propagation algorithm to adjust the deep convolutional neural network model until the model meets the accuracy threshold or reaches the preset maximum iteration number. After the training, the image fault classification model is obtained.

And further, in the convolution filtering process of the convolution layer, the maximum pooling technique of the pooling layer, and the fully connected layer, the activation function adopted are function linear correction unit ReLUs.

And further, the image fault classification model and text fault classification model are fused by a logistic regression algorithm to obtain the fusion model, specifically:

The output result of the image fault classification model is $x_i^A$, and the output result of the text fault classification model is $x_i^B$, the two constitute the input of the fusion model $x_i^3 = [x_i^A \; x_i^B]$.

Among them, the number of the complex information data of photovoltaic array working state collected by S1 is N, i=1, 2, ..., N.

Suppose $x_i^3 \in R^n$, when $y_i$ equals 0, it is normal working state; when $y_i$ equals 1, it is hot spot fault; when $y_i$ equals 2, it is open circuit fault; when $y_i$ equals 3, it is short circuit fault.

The training data set of the fusion model is $T^3 = \{(x_1^3, y_1), (x_2^3, y_2), \ldots, (x_N^3, y_N)\}$.

Multiple logistic regression model is established by using a logistic regression algorithm, as the fusion model:

$$P(Y = k \mid x) = \frac{1}{1 + \sum_{k=0}^{K-1} \exp(w_k \cdot x)}$$

where k=1, 2, ... K−1, K=4, $x \in R^{n+1}$, $w_k \in R^{n+1}$ and $w_k$ is the weight of the fusion model.

The weight of the fusion model is trained by using the training data set $T^3$ of the fusion model, and the fusion model after the training is used as the photovoltaic array fault diagnosis model based on composite information.

Beneficial Effects

1. The photovoltaic array fault diagnosis method based on composite information proposed by the invention establishes fault classification models based on image data and text data respectively. Fault classification of image data is carried out by deep convolutional neural network. The text data fault classification represented by voltage and current is carried out by a support vector machine. Finally, the two models are fused by a logistic regression algorithm, and the photovoltaic array fault diagnosis method based on composite information is finally realized. The invention is capable of fault classification for image data and text data simultaneously. Compared with the traditional fault diagnosis method which uses single type fault information for fault diagnosis and analysis, the invention can make full use of fault information and break the limitation of traditional technology. Since image fault classification model and text fault classification model have different sensitivity and types of data, the fusion of the two models increases the robustness of fault diagnosis model, reduces the dependence on domain expert knowledge, and improves the accuracy of fault diagnosis.

2. The invention proposes a photovoltaic array fault diagnosis method based on deep convolutional network and a support vector machine. This method is different from the traditional fault diagnosis by using image processing method. Instead, a large number of infrared images are processed with the powerful feature extraction capability of deep convolutional neural network. As a result, the dependence on expert experience is greatly reduced. For text data processing, the support vector machine algorithm is also used for efficient fault classification.

DETAILED DESCRIPTION OF THE EMBODIMENTS

The invention is described in detail below with reference to the drawings and embodiments.

Figure 1:
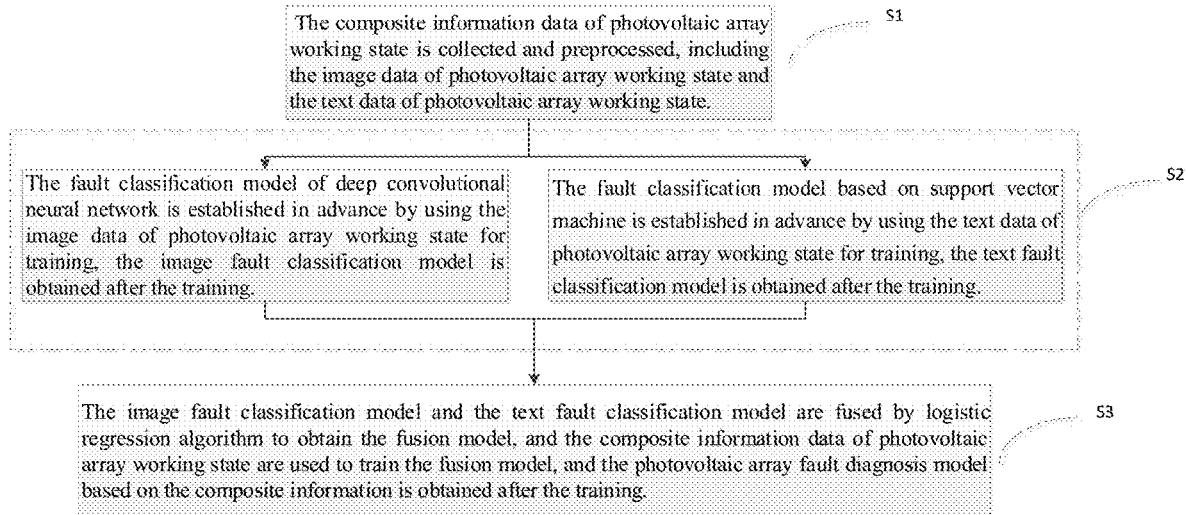
FIG. 1 is a flow chart of the photovoltaic array fault diagnosis method based on composite information according to an embodiment of the invention.

The invention provides a photovoltaic array fault diagnosis method based on composite information. The flow of this method is shown in FIG. 1, including:

S1. The composite information data of photovoltaic array working state is collected and preprocessed, including the image data of photovoltaic array working state and the text data of photovoltaic array working state.

In the embodiment of the invention, the working state of the photovoltaic array includes: normal working state, hot spot fault, open circuit fault and short circuit fault; a corresponding label is set for each working state.

The image data of photovoltaic array working state includes the photovoltaic array infrared images and the working state labels of the photovoltaic array.

The text data of photovoltaic array working state include the open-circuit voltage, short-circuit current, maximum high-power point voltage, maximum high-power point current, ambient light intensity, temperature, and labels describing the working state of the photovoltaic array.

In the embodiment of the invention, preprocessing the composite information data of photovoltaic array working state includes preprocessing the image data and text data of photovoltaic array working state.

Among them, the preprocessing of the image data of photovoltaic array working state includes the following:

S101. The image data of array working state is converted into RGB images and the data is standardized; The images of photovoltaic array working state collected in the embodiment of the invention are infrared images. The infrared images are converted into a three-dimensional RGB images with 160×120 pixels. In order to eliminate the dimensional influence between feature vectors, data standardization is needed to solve the comparability between data indexes. After the data standardization of the original data, each index is in the same order of magnitude, which is suitable for comprehensive comparative evaluation.

The embodiment of the invention uses the z-score standardized method, as shown in the following formula:

$$x_p^A = \frac{x_u^A - \mu^A}{\sigma^A}$$

Where, $x_p^A$ represents the working state image of the photovoltaic array after preprocessing; $x_u^A$ represents the original working state image of the photovoltaic array, which can be represented as the image pixel matrix; $\mu^A$, $\sigma^A$ respectively represent the mean and standard deviation of the photovoltaic array working state image. The processed data conforms to the standard normal distribution, that is, the mean value is 0 and the standard deviation is 1.

S102. Principal component analysis (PCA) whitening is used to process the image data of array working state after standardized processing.

The preprocessing of the text data of photovoltaic array working state includes the following contents. The text data of photovoltaic array working state is standardized.

Because the dimensions of voltage, current, temperature and illumination are not uniform. In order to eliminate the dimensional effect between feature vectors, data standardization is needed to resolve the comparability between data indexes. After the standardization of the original data, each index is in the same order of magnitude, which is suitable for comprehensive comparative evaluation.

The embodiment of the invention uses the z-score standardized method, as shown in the following formula:

$$x_p^B = \frac{x_u^B - \mu^B}{\sigma^B}$$

where $x_p^B$ represents the preprocessed text data; $x_u^B$ represents the original text data; $\mu^B$, $\sigma^B$ respectively represents the mean and standard deviation of the original text data. The processed text data conforms to the standard normal distribution, that is, the mean value is 0 and the standard deviation is 1.

S2. The fault classification model of deep convolutional neural network is established in advance by using the image data of photovoltaic array working state for training, and the image fault classification model is obtained after the training.

The fault classification model based on a support vector machine (SVM) is established in advance by using the text data of photovoltaic array working state for training, and the text fault classification model is obtained after the training.

Figure 2:
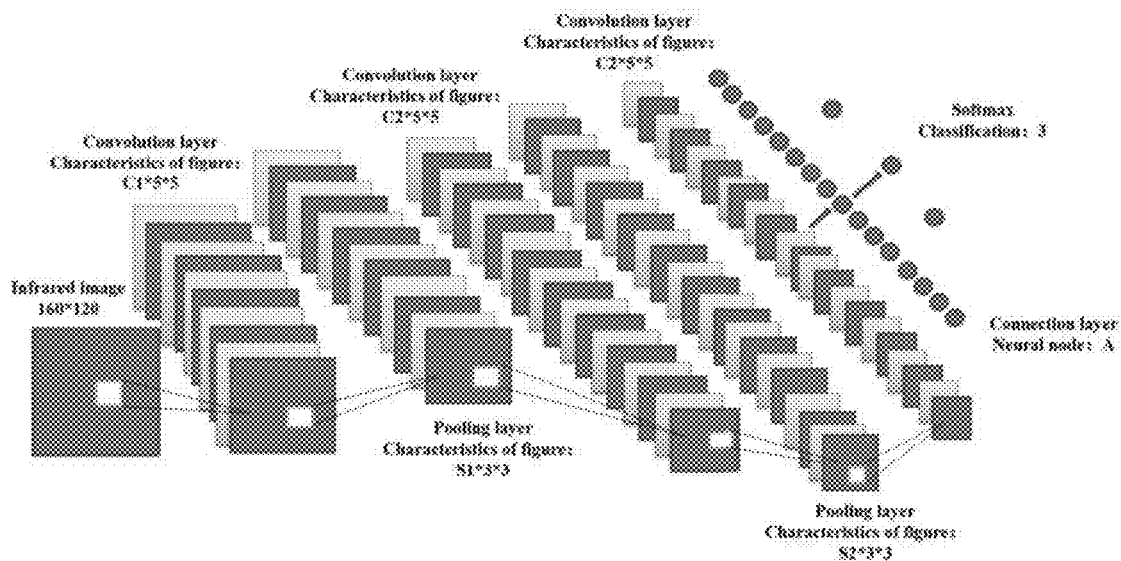
FIG. 2 is a basic structure diagram of deep convolutional neural network according to an embodiment of the invention.

In the embodiment of the invention, the following steps are used to train the image fault classification model:

S21. The fault classification model of deep convolutional neural network is established in advance, including input layer, convolution layer, pooling layer, fully connected layer and output layer. The fault classification model of deep convolutional neural network pre-established in the example of the invention has the basic structure of deep convolutional neural network as shown in FIG. 2, which includes an input layer, three convolutional layers, two pooling layers, a fully connected layer and an output layer. The convolution layer and the pooling layer are interleaved, and the step size of both the convolution layer and the pooling layer is 2.

S22. The image data of photovoltaic array working state is used as the training sample images. Multiple training sample images are randomly sampled to form a minimum batch file, namely mini-batch. It is input to the input layer of fault classification model of deep convolutional neural network;

The input layer inputs the training sample images of the minimum batch file (mini-batch) into the convolution layer;

There are n convolution kernels in the convolution layer, where n is a set value. The n convolution kernels are used to perform convolution filtering on the images entering the convolution layer to extract n neighborhood feature images. In the embodiment of the invention, the image entering the convolution layer may be a training sample image entered from the input layer, or a new feature image entered through the previous pooling layer. In the embodiment of the invention, different convolution layers have different number of convolution kernels. The more convolution kernels there are, the more feature images will be obtained, and the stronger the model's learning ability will be, the better the recognition effect will be.

However, too many convolution kernels will increase the complexity of the network and increase the complexity of computation. The sample size used in this embodiment is small, so the convolution kernel selected is large.

In the embodiment of the invention, the activation function used in the convolution filtering is ReLUs (function linear correction unit). Compared with the sigmoid and tanh functions, its characteristics of nonlinearity, unsaturated and unilateral inhibition, relatively wide excitation boundary and sparse activation all enable it to achieve better results in training.

The neighborhood feature images are then input into the pooling layer. The pooling layer uses the maximum pooling technique to sample the neighborhood feature images and obtain the new feature images. The function of pooling layer is mainly to reduce the feature dimension by sampling according to the invariance of the image neighborhood features, and make the features after sampling maintain some invariance (rotation, translation, expansion, etc.), which can effectively reduce the computational complexity and prevent overfitting (the activation function of the pooling layer still uses ReLUs).

The fault classification model of deep convolutional neural network has a set number of convolution layers and pooling layers. The new feature images obtained from the pooling layer would always be input into the next convolution layer or the fully connected layer.

By the fully connected layer, the new feature images are expanded into one-dimensional feature vectors, which would be outputted in the output layer as the training sample image features. Since the nodes of the fully connected layer are often large, in order to prevent the occurrence of overfitting, the dropout method is used in the fully connected layer to make some hidden nodes not work. That is, in each iteration, some hidden nodes are selected as working nodes by probability p, and the hidden nodes in dropout are not updated when the weight is updated in the back propagation. The activation function still uses ReLUs.

The output layer is a softmax classifier, which uses the training sample image features and the photovoltaic array working state labels of the training sample images to train the softmax classifier, and uses the back propagation algorithm to adjust the deep convolutional neural network model until the model meets the accuracy threshold or reaches the preset maximum iteration number. After the training, the image fault classification model is obtained.

The invention proposes a photovoltaic array fault diagnosis method based on deep convolutional network and a support vector machine. This method is different from the traditional fault diagnosis by using image processing method. Instead, a large number of infrared images are processed with the powerful feature extraction capability of deep convolutional neural network. As a result, the dependence on expert experience is greatly reduced. For text data processing, a support vector machine algorithm is also used for efficient fault classification.

In the embodiment of the invention, the conventional nonlinear support vector machine learning algorithm in the field is used to establish a text fault classification model. In the invention, a specific implementation form of a common nonlinear support vector machine learning algorithm is presented to prove that the algorithm is feasible, and is not intended to limit the invention. Specifically:

S201. The training data set after pretreatment is: $T=\{(x_1^B, y_1), (x_2^B, y_2), \ldots, (x_N^B, y_N)\}$ Where, $x_i^B \in R^n$ vector, $y_i \in Y=\{0,1,2,3\}$, $i=1, 2, \ldots, N$ and N is the total number of text data.

S202. Establish classification decision function as text data classification model:

$$f(x) = \text{sign}\left(\sum_{i=1}^{N} \alpha_i^* y_i K(x \cdot x_i^B) + b^*\right)$$

When K(x,z) is a positive definite kernel function, the above equation is a convex quadratic programming problem, and the solution exists. a* and b* are the parameters of the classification decision function, namely the weight of the text data classification model.

Select proper kernel function K(x,z) and proper parameter C to construct and solve the optimization problem.

$$\min_{\alpha} \frac{1}{2} \sum_{i=1}^{N} \sum_{j=1}^{N} \alpha_i \alpha_j y_i y_j K(x_i^B, y_j) - \sum_{i=1}^{N} \alpha_i$$

$$\text{s.t.} \sum_{i=1}^{N} \alpha_i y_i = 0$$

Where, $0 \leq \alpha \leq C$ the weight vector of the text classifier model $\alpha=(\alpha_1, \alpha_2, \ldots, \alpha_N)^T$, $i=1, 2, \ldots N$; Find the optimal solution $\alpha^*=(\alpha_1^*, \alpha_2^*, \ldots, \alpha_N^*)^T$.

Choose $\alpha^*$ a positive component $0 \leq \alpha_j^* \leq C$, calculate $$b^* = y_j - \sum_{i=1}^{N} \alpha_i^* y_i K(x_i \cdot y_j).$$

S3. The image fault classification model and the text fault classification model are fused by a logistic regression algorithm to obtain the fusion model, and the composite information data of photovoltaic array working state are used to train the fusion model, and the photovoltaic array fault diagnosis model based on the composite information is obtained after the training.

Specifically:

The output result of the image fault classification model is $x_i^A$, and the output result of the text fault classification model is $x_i^B$, the two constitute the input of the fusion model $x_i^3=[x_i^A \ x_i^B]$.

Among them, the number of the complex information data of photovoltaic array working state collected by S1 is N, $i=1, 2, \ldots, N$.

Suppose $x_i^3 \in R^n$, when $y_i$ equals 0, it is normal working state; when $y_i$ equals 1, it is hot spot fault; when $y_i$ equals 2, it is open circuit fault; when $y_i$ equals 3, it is short circuit fault.

The training data set of the fusion model is $T^3=\{(x_1^3, y_1), (x_2^3, y_2), \ldots, (x_N^3, y_N)\}$.

Multiple logistic regression model is established by using a logistic regression algorithm, as the fusion model:

$$P(Y = k \mid x) = \frac{1}{1 + \sum_{k=0}^{K-1} \exp(w_k \cdot x)}$$

where $k=1, 2, \ldots K-1$, $K=4$, $x \in R^{n+1}$, $w_k \in R^{n+1}$ and $w_k$ is the weight of the fusion model.

The weight of the fusion model is trained by using the training data set $T^3$ of the fusion model, and the fusion model after the training is used as the photovoltaic array fault diagnosis model based on composite information.

The photovoltaic array fault diagnosis method based on composite information proposed by the invention establishes fault classification models based on image data and text data respectively. Fault classification of image data is carried out by deep convolutional neural network. The text data fault classification represented by voltage and current is carried out by support vector machine. Finally, the two models are fused by logistic regression algorithm, and the photovoltaic array fault diagnosis method based on composite information is finally realized. The invention is capable of fault classification for image data and text data simultaneously. Compared with the traditional fault diagnosis method which uses single type fault information for fault diagnosis and analysis, the invention can make full use of fault information and break the limitation of traditional technology. Since image fault classification model and text fault classification model have different sensitivity and types of data, the fusion of the two models increases the robustness of fault diagnosis model, reduces the dependence on domain expert knowledge, and improves the accuracy of fault diagnosis.

In summary, the above is only an embodiment of the invention and is not used to limit the protection scope of the invention. Any modification, equivalent substitutions, improvement etc. made in the spirit and principles of the invention shall be included in the protecting scope of the invention.

The invention claimed is:

1. A fault diagnosis method for a photovoltaic array, comprising:

collecting and preprocessing composite information data of a status of the photovoltaic array, the composite information data including image data of the status of the photovoltaic array and text data of the status of the photovoltaic;

training a fault classification model of a deep convolutional neural network using the image data of the status of the photovoltaic array, thereby obtaining an image fault classification model after the training, and training a fault classification model based on a support vector machine (SVM) using the text data of the status of the photovoltaic array, thereby obtaining a text fault classification model after the training; and fusing the image fault classification model and the text fault classification model by a logistic regression algorithm to obtain the fusion model, and training the fusion model using the composite information data of the status of the photovoltaic array, thereby obtaining a photovoltaic array fault diagnosis model, wherein the status of the photovoltaic array includes a normal working state, a hot spot fault state, an open circuit fault state and a short circuit fault state; wherein a label is set for each of the normal working state, the hot spot fault state, the open circuit fault state and the short circuit fault state;

wherein the image data of the status of the photovoltaic array include the photovoltaic array infrared images and the labels for the normal working state, hot spot fault state, open circuit fault state and short circuit fault state of the photovoltaic array; and wherein the text data of the status of the photovoltaic array include the open-circuit voltage, short-circuit current, maximum high-power point voltage, maximum high-power point current, ambient light intensity, temperature, and the labels for the normal working state, hot spot fault state, open circuit fault state and short circuit fault state of the photovoltaic array.

2. The method of claim 1, wherein:

preprocessing composite information data of the status of the photovoltaic array comprises preprocessing the image data and text data of the status of the photovoltaic array;

wherein the preprocessing of the image data of the status of the photovoltaic array includes: converting the image data of the status of the photovoltaic array into RGB images and standardizing the converted data of the RBG images; and using principal component analysis (PCA) whitening to process the standardized data of the RBG images, and wherein the preprocessing of the text data of the status of the photovoltaic array includes:

standardizing the text data of the status of the photovoltaic array.

3. The method of claim 2, wherein:

the fault classification model of deep convolutional neural network is established in advance by using the image data of the status of the photovoltaic array for training, whereby the image fault classification model is obtained after the training; wherein:

the fault classification model of deep convolutional neural network is established in advance, including an input layer, a convolution layer, a pooling layer, a fully connected layer and an output layer;

the image data of the status of the photovoltaic array is used as the training sample images; and multiple training sample images are randomly sampled to form a minimum batch file, then input to the input layer of fault classification model of deep convolutional neural network;

the input layer inputs the training sample images of the minimum batch file into the convolution layer;

there are n convolution kernels in the convolution layer, where n is a set value, and the n convolution kernels are used to perform convolution filtering on the images in the convolution layer, so as to extract n neighborhood feature images;

the neighborhood feature images are then input into the pool layer, and the pool layer uses the maximum pooling technique to sample the neighborhood feature images and obtain the new feature images;

the fault classification model of deep convolutional neural network has a set number of convolution layers and pooling layers, and the new feature images obtained from the pooling layer are input into the next convolution layer or the fully connected layer;

by the fully connected layer, the new feature images are expanded into one-dimensional feature vectors, which are outputted in the output layer as the training sample image features;

the output layer is a softmax classifier, which uses the training sample image features and the labels of the training sample images to train the softmax classifier, and uses the back propagation algorithm to adjust the deep convolutional neural network model until the model meets the accuracy threshold or reaches the preset maximum iteration number, whereby the image fault classification model is obtained after the training.

4. The method of claim 3, wherein:

in the convolution filtering process of the convolution layer, the maximum pooling technique of the pooling layer, the fully connected layer, and the activation function adopted are function linear correction unit ReLUs.

5. The method of claim 2, wherein:

the image fault classification model and text fault classification model are fused by a logistic regression algorithm to obtain the fusion model as follows:

the output result of the image fault classification model is $x_i^A$, and the output result of the text fault classification model is $x_i^B$, the two constitute the input of the fusion model $x_i^3 = [x_i^A \ x_i^B]$;

among them, the number of the complex information data of the status of the photovoltaic array collected by S1 is N, i=1, 2, . . . , N;

suppose $x_i^3 \in R^n$, when $y_i$ equals 0, it is the normal working state; when $y_i$ equals 1, it is the hot spot fault state; when $y_i$ equals 2, it is the open circuit fault state; when $y_i$ equals 3, it is the short circuit fault state;

the training data set of the fusion model is $T^3 = \{(x_1^3, y_1), (x_2^3, y_2), \ldots, (x_N^3, y_N)\}$;

the multiple logistic regression model is established by using logistic regression algorithm, as the fusion model:

$$P(Y = k \mid x) = \frac{1}{1 + \sum_{k=0}^{K-1} \exp(w_k \cdot x)}$$

where k=1, 2, . . . K−1, K=4, $x \in R^{n+1}$, $w_k \in R^{n+1}$ and $w_k$ is the weight of the fusion model; and the weight of the fusion model is trained by using the training data set $T^3$ of the fusion model, and the fusion model after the training is used as the photovoltaic array fault diagnosis model based on composite information.

* * * * *